M. R. RODRIGUES.

PROTECTIVE COVERING FOR ATTACHMENT PLUGS.

APPLICATION FILED JAN. 3, 1913.

Reissued Feb. 25, 1913. 13,535.

Witnesses:
William Clinton Burling
Chester A. La Fetra

Inventor:
M. R. Rodrigues.
by J. O. Fowler.
atty.

UNITED STATES PATENT OFFICE.

MANUEL R. RODRIGUES, OF NEW YORK, N. Y.

PROTECTIVE COVERING FOR ATTACHMENT-PLUGS.

13,535. Specification of Reissued Letters Patent. Reissued Feb. 25, 1913.

Original No. 1,040,762, dated October 8, 1912, Serial No. 664,525. Application for reissue filed January 3, 1913. Serial No. 740,269.

*To all whom it may concern:*

Be it known that I, MANUEL R. RODRIGUES, a citizen of the United States of America, and a resident of the borough of Brooklyn, county of Kings, city and State of New York, have invented a certain new and useful Protective Covering for Attachment-Plugs, of which the following is a specification, the same being a full, clear, and exact description of the invention, such as will enable others skilled in the art to which it appertains to make and use the same.

This invention relates to improvements in that class of devices which are primarily adapted to be inserted into a socket designed to receive an electric lamp, although the invention may be applied to, and advantageously employed in, other devices and with other connections when the same may be deemed to be desirable.

Attachment plugs of the class which comprise the invention ordinarily consist of a body, or attachment plug proper, and a detachable cap therefor, and inasmuch when the cap is detached it is liable to fall and to become broken on account of the brittleness or frangibility of the insulating material ordinarily used, I have designed an attachment plug and separable cap combined with an outer protective unbreakable shell, sheath or casing therefor, and have constructed according to my invention an appliance of the class described embodying the preferred construction of parts and their mutual operation and combination, arrangement and organization in a composite body or structure as hereinafter described.

To attain the desired end the invention consists in certain novel devices and combination of devices forming in operation a simple and efficient organization.

In order to enable the invention to be fully understood, I shall proceed to explain the same by reference to the drawings, illustrative of an embodiment of the invention, which accompany and form a part of this specification, and in which—

Figure 1:
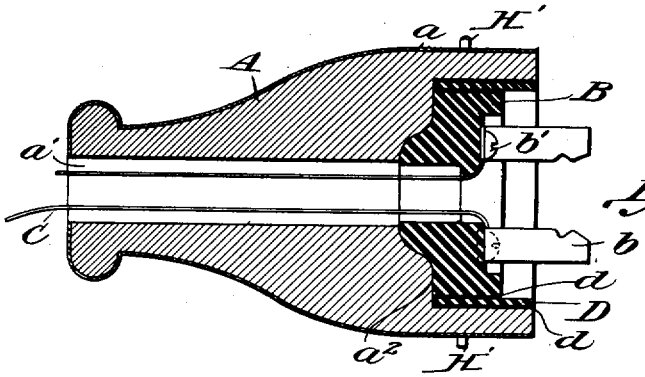
Figure 2:
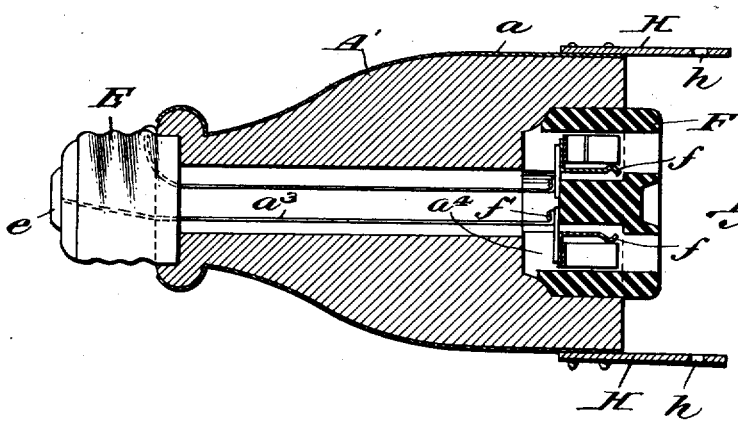
Figure 3:
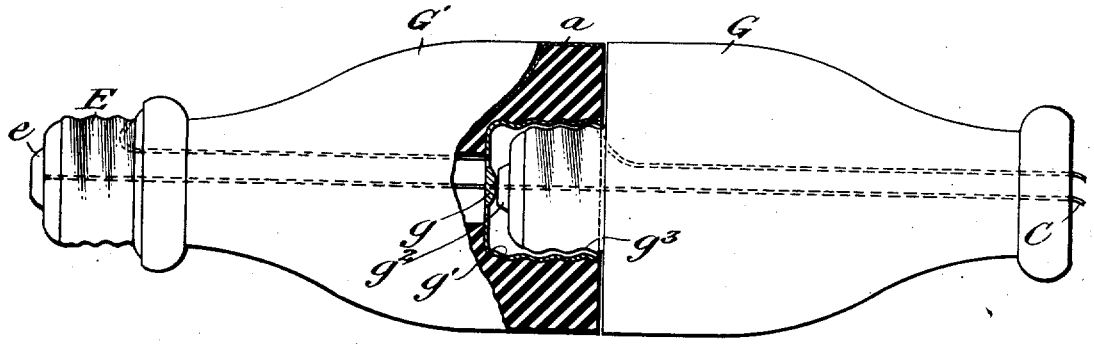

Figures 1 and 2 are longitudinal sections respectively of the attachment plug and cap therefor, the same being shown in a detached relation, and Fig. 3 is a longitudinal section of an assembled attachment plug and cap which embody another form of my invention.

Referring particularly by reference characters or symbols to the drawings, A denotes one of the separable members of my device, in this instance consisting of the attachment plug cap and preferably consisting of the electrodes and support therefor inclosed either flush or otherwise in a sheath or body portion made of any tough insulating material, as wood composition, fiber, cork, etc., which may, if desired, be covered with a metallic casing or shell $a$. The said member is preferably constructed with an interior longitudinal passage, or channel, or bore $a'$ running through the same, to contain the main line conductors, which bore is ordinarily enlarged at the operative end of the device so as to preferably form a socket or recessed portion $a^2$ in which is ordinarily rigidly secured the plug cap proper B, preferably having contact fingers $b$ which may be suitably connected in an electrical relation, by the binding screws $b'$, with the main line conductors as the wires C. The cap B, which is ordinarily made of porcelain, is preferably held in position by means of cement $d$ ordinarily applied to each side of a preferably yielding or resilient packing D, as of rubber or like material. The other separable member A′ of my device, containing the body of the attachment plug or the attachment plug proper, is also ordinarily made of insulating material and preferably of the same tough substance as the member A. It also preferably has a metallic casing or shell $a$. One end of the cap member is ordinarily screw threaded, as at E, which thread is adapted and arranged to be entered into the corresponding screw threaded contact shell of an ordinary lamp socket. The member A′ is also preferably formed with an interior bore or channel $a^3$ terminating in an enlarged recess or pocket $a^4$ in which is ordinarily securely fastened the attachment plug proper F provided with contact springs $f$, or other suitable devices, adapted and arranged to be engaged with the projecting contact springs or strips $b$. The attachment plug body may be held within the sheath A′ in the same manner as the cap therefor is held within the covering A. The contact springs $f$ are placed in electrical relation, as by binding screws $f'$, with the two electrodes consisting of the metallic screw thread E and the insulated pin $e$ by means of conducting means in the ordinary or any suitable manner.

The two members A and A′ of my device may be readily engaged and detached by being moved toward and away from each other on the line of their axis, and in case the member A should be accidentally dropped when so detached, it will not break on account of the frangible portion of the same, which is ordinarily made of porcelain, being so inclosed in a protective sheath or covering as to thoroughly protect the same from fracture.

In the form of my invention embodied in the device illustrated in Fig. 3 the member G′ may be provided with a screw threaded socket $g'$ and insulated contact pin $g$ which may be engaged by the screw threaded end $g^3$ of the attachment plug cap G. The metallic screw thread $g^3$ and the insulated pin $g^2$ are placed in electrical relation with the conductors.

The two members may be held together by means of the engagement of the electric connections thereof, but I preferably use suitable means for positively attaching the same together, as, for example, one member may carry spring fingers H attached to the opposite sides of the periphery thereof and having orifices $h$ at the free ends of the said fingers which may register and interlock with, or be snapped upon, pins H′ secured to the other member.

Inasmuch as some portions or features of my invention may manifestly be used without all of the others, and as obvious modifications will occur to persons skilled in the art, and as my invention may be embodied in widely varying forms, I wish it to be understood that I do not desire to be limited to the exact details of construction shown and described.

What I claim as my invention is:—

1. An attachment plug consisting of two members, one member comprising a screw socket at one end, contact devices mounted on an insulating base at the other extremity, and an intermediate tough body portion, and the other member comprising contact devices mounted on an insulating base at one end, an outlet for the line conductors at the other extremity, and an intermediate tough body portion.

2. An attachment plug consisting of two members, one member comprising a screw sockets at one end, contact devices mounted on an insulating base at the other extremity, and an intermediate tough body portion, and the other member comprising contact devices mounted on an insulating base at one end, an outlet for the line conductors at the other extremity, and an intermediate tough body portion, the body portion of each member being formed with a recessed portion to contain the said contact devices.

3. An attachment plug consisting of two members, one member comprising a screw socket at one end, contact devices mounted on an insulating base at the other extremity, and an intermediate tough body portion, and the other member comprising contact devices mounted on an insulating base at one end, an outlet for the line conductors at the other extremity, and an intermediate tough body portion, the body portion of each member being provided with means to hold the same together in an interlocked relation.

In testimony of the foregoing specification I do hereby sign the same in the borough of Brooklyn, city of New York, county of Kings and State of New York, this 1st day of December, 1911.

MANUEL R. RODRIGUES.

Witnesses:

JOSEPH A. CAHILL,
E. A. MARSCHALK.